Aug. 2, 1960 H. D. HERN 2,947,951

STABILIZED FREQUENCY MODULATOR

Filed May 26, 1958 2 Sheets-Sheet 1

INVENTOR.
HOWARD D. HERN
BY Moody and Goldman
ATTORNEY

Aug. 2, 1960 H. D. HERN 2,947,951

STABILIZED FREQUENCY MODULATOR

Filed May 26, 1958 2 Sheets-Sheet 2

INVENTOR.
HOWARD D. HERN
BY Moody and Goldman
ATTORNEY

United States Patent Office 2,947,951
Patented Aug. 2, 1960

2,947,951

STABILIZED FREQUENCY MODULATOR

Howard D. Hern, Cedar Rapids, Iowa, assignor to Collins Radio Company, Cedar Rapids, Iowa, a corporation of Iowa Filed May 26, 1958, Ser. No. 737,741

10 Claims. (Cl. 332—19)

This invention relates generally to the long-realized problem of obtaining automatic-frequency control for a frequency-modulator capable of operating with a large modulation index while maintaining cooperative simplicity of circuitry.

The stabilization of wide-index frequency-modulators presents a very different problem than the stabilization of amplitude-modulated waves or very-small-index angularly-modulated waves. Thus, amplitude-modulated and small-index angularly-modulated waves can be derived by direct modulation of a highly stable frequency. In these cases, the stabilized wave directly provides the carrier component of the modulated wave. On the other hand, a large-index wave cannot be directly derived from a highly stable wave.

Basically, the rigidity of stabilization is opposed to frequency variation, which must be large with a large-index modulator. Consequently, large-index waves must inherently be generated by a low-stability device, and some external means must be provided to stabilize its operation.

Many prior systems have been devised to enable the stabilization of the center frequency of a frequency-modulated signal. Most prior systems initially utilize small-index angular modulators which can readily be stabilized because of their small deviation, followed by frequency multiplication to increase the modulation index to a required amount. Such systems are generally complex and require many tubes, particularly in the frequency multipliers. An example of a prior frequency-stabilized modulator is a low index phase-modulation system using a frequency-stabilized sawtooth wave. The sawtooth wave is truncated at varying points by the modulating signal and differentiated to generate pulse-position modulation, which drives a ringing circuit to provide a wave of very small index which is expanded by frequency multiplication.

Another type of prior F.M. modulator directly-heterodynes the output of a wide deviation frequency-modulated oscillator to a low level by means of a crystal-stabilized frequency and the heterodyne F.M. wave is applied to a discriminator, which controls the stability of the oscillator. The heterodyned signal contains all the modulation and occupies a wide spectrum. In such case, the discriminator must be linear over the whole spectrum. Yet, the degree of stability is dependent upon how low the center frequency of the discriminator can be made, since system stability is dependent upon the tuning accuracy of the discriminator; which increases in direct proportion as the center frequency of the discriminator is made lower. The requirements of low center frequency and wide-band linearity are contradictory, since linearity for conventional discriminators exist only over a small percentage of its center frequency. Nonlinearities in the bandpass of the discriminator cause a false direct-current shift in its output, resulting in a false frequency-shift that adversely affects output frequency stability of the system. The frequency stability of such system also decreases in proportion to the increase in the center frequency of the discriminator. Hence, on the one hand, increasing the center frequency of the discriminator to obtain bandwidth linearity decreases stability; and on the other hand, decreasing the center frequency decreases discriminator linearity which causes false frequency-shift.

Still another prior method of stabilizing a wide-index modulator is a modification of the system in the last paragraph; wherein a very-narrow-band filter, such as a crystal-lattice filter, receives the heterodyned modulated wave and passes only its carrier-frequency component to the stabilizing discriminator. This eliminated the need for a wide-band discriminator and greatly reduced its linearity requirement. Nevertheless, basic limitations still adhere. Firstly, before stabilization by the system can begin, the modulation carrier initially must be sufficiently stable to fall within the bandpass of the filter. Since the filter must have a very-narrow bandpass to separate carrier from sidebands, there must be a relatively high inherent stability in the modulator. This initially limits the modulator to a small modulation-index. Secondly, this type of system is still limited in regard to how low its stabilizing discriminator can be tuned, which is limited to a frequency equal to one-half of the maximum width of a sideband. Heterodyning below this value will cause a sideband to fold-over into the carrier frequency and cause instability. In some cases, the filter and discriminator operations are combined into a single crystal-discriminator for this type of system. Furthermore, crystal filters at relatively high frequencies are generally very expensive relative to other components in the system.

It is therefore an object of this invention to provide an automatic-frequency-controlled wide-band frequency modulator having simple construction and capable of using inexpensive components, which permits substantial economy over prior frequency-stabilized F.M. modulators.

It is another object of this invention to provide an automatic-frequency-control system which can stabilize a very wide-band F.M. signal to any required degree of frequency or phase stability.

It is a further object of this invention to provide a frequency modulator capable of simple construction and large-index operation that can have its center frequency phase-locked to a reference frequency.

It is a still further object of this invention to provide a large-index angular-modulator stabilized by means of a discriminator, wherein the tuned frequency of the discriminator can be made as low as required.

It is another object of this invention to provide a large-index angular-modulation generator stabilized by an AFC discriminator, wherein discriminator nonlinearities do not contribute to system instability.

It is a feature of this invention to provide an automatic frequency-control-system for a wide-band frequency-modulation generator having a discriminator as a frequency-stabilizing element that receives only a single frequency outside of the message spectrum rather than a band of frequencies, regardless of the modulation bandwidth or index used.

This invention includes a frequency-modulator and a fixed reference oscillator providing a reference frequency having a value greater than one-half the maximum utilized output spectrum of the modulator. The modulator is simultaneously modulated both by an input message-signal and the reference frequency. The reference frequency generates upper and lower F.M. spectrum components spaced from the F.M. center frequency by the magnitude of the reference frequency. These upper and lower components are referred to hereafter as upper and lower stabilizing frequencies. A filter connected to the output of the modulator selects either the upper or lower stabilizing frequency, although preferably the lower one. A frequency mixer heterodynes the filtered stabilizing frequency with a multiple of the reference frequency near to the filtered frequency. A discriminator is tuned to a frequency equal to the difference between the multiple of the reference frequency and a required value of the filtered stabilizing frequency. The discriminator provides an output direct-current other than zero when the filtered stabilizing frequency differs from the discriminator's tuned frequency, and the polarity of the direct-current indicates the sense of any instability.

Further objects, features and advantages of this invention will be apparent to a person skilled in the art upon further study of the specification and the accompanying drawings, in which.

Figure 1:
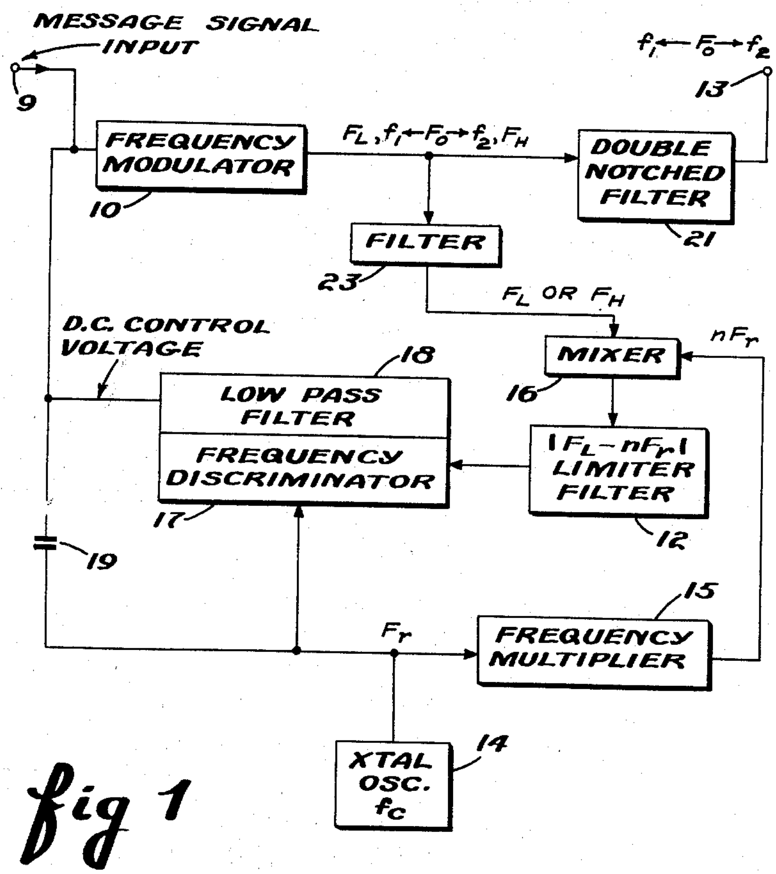
Figure 1 illustrates a form of the invention.

In the form of the invention illustrated in Figure 1, a wide-index frequency-modulator 10 that may be conventional, such as a reactance-tube-modulated oscillator, receives a modulating signal at input terminal 9. The frequency-deviating output signal from modulator 10 is provided to an output terminal 13 through a notched-filter 21. A modulating input signal is received at input terminal 9 to modulate modulator 10 with a varying modulation-index dependent, of course, upon the instantaneous variations of the modulating signal. The modulation index can vary from a low value to a very high value, as for example through a range between 0.5 and 160,000, for a television signal of band 30 cycles to 4.5 megacycles.

Figure 2:
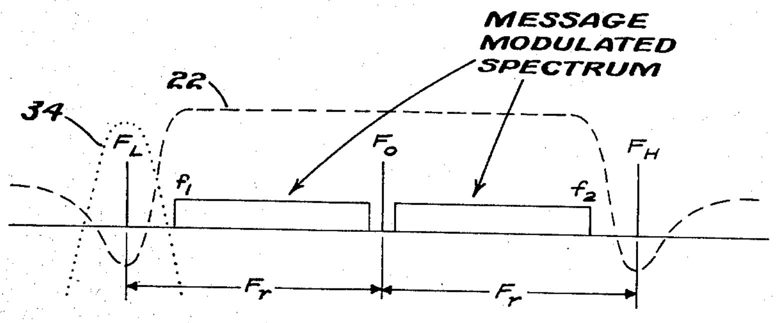
Figure 2 illustrates a composite spectrum and filter characteristic useable in the invention.

A crystal oscillator 14 provides a highly stable reference frequency. An output from oscillator 14 is coupled to the input of modulator 10. Figure 2 illustrates the composite spectrum provided at the output of modulator 10. Lower and upper sideband frequencies $F_L$ and $F_H$ result from modulation by reference frequency $F_r$. Hence, $F_L$ and $F_H$ are each spaced from carrier $F_o$ by an amount precisely equal to $F_r$. The band of frequencies bounded by $f_1$ and $f_2$ are created by the message provided at input terminal 9. Thus, frequencies $f_1$ and $f_2$ are also symmetrical about carrier $F_o$.

The reference frequency $F_r$ is chosen from a consideration of the extreme message frequencies $f_1$ and $f_2$, in that $F_r$ is substantially greater than $|F_o-f_1|$ or $|F_o-f_2|$. More specifically, the difference between $F_L$ and $f_1$, and similarly between $F_H$ and $f_2$, is determined to be a "filterable difference"; a "filterable difference" is a sufficient separation that enables filtering of one frequency from the other by means of commonly available and inexpensive types of filters. Hence, the spectrum components caused by crystal oscillator are sufficiently separated from the signal's message modulation spectrum so that later they can be filtered out, where required, without disturbing the message modulation spectrum.

Double-notched filter 21 has the response 22 given in Figure 2 which filters through the signal modulation spectrum and attenuates frequencies $F_L$ and $F_H$ due to the positions of the notches. The design of filters having such notches characteristics is well-known.

A filter 23 is connected to the output of modulator 10 and is tuned to either frequency $F_L$ of frequency $F_H$. In this example, filter 23 is tuned to frequency $F_L$. The tuning response of filter 23 is shown in Figure 2 by dotted line 34. Filter 23 is relatively narrow band, but its tuning need not be precise since there are no other frequency components near to frequency $F_L$.

A frequency multiplier 15 in Figure 1 is connected to the output of crystal oscillator 14 and multiplies its frequency by a factor $n$. Thus, a mixer 16 receives frequency $nF_r$ from multiplier 15 and frequency $F_L$ from filter 23.

Accordingly, there is provided at the output of mixer 16 a frequency component $(F_L-nF_r)$ which is selected by a filter and limiter 12 and is received by a discriminator 17. Frequency $nF_r$ is fixed; however, frequency $F_L$ varies with instability of carrier $F_o$ since they have a fixed relationship. Hence, their difference $(F_L-nF_r)$ varies directly with $F_L$. Consequently, when center frequency $F_o$ is at its stabilized value, there will be a corresponding value of $F_L$ and of difference $(F_L-nF_r)$ that is designated as $F_d$. Discriminator 17 is tuned to frequency $F_d$; thus, it provides a null when the mixer output frequency $(F_L-nF_r)$ is at $F_d$ and provides opposite polarity direct-current outputs when $(F_L-nF_r)$ is above or below $F_d$. Correspondingly, the discriminator output is nulled when $F_o$ is stabilized and provides opposite polarity outputs when above or below its stabilized value. A capacitor 19 blocks the direct-current output of discriminator 17 from reference source 14 and multiplier 15. The direct-current output of discriminator 17 is provided to the variable reactance part of modulator 10 to pull its frequency band up or down until its center frequency contributes a null condition to discriminator 17, during which the center frequency $F_o$ is stabilized.

Since the error in crystal-oscillator frequency $F_r$ is exceedingly small and negligible compared to the likely error $\Delta F_d$ of discriminator tuned frequency $F_d$, the error in center frequency $F_o$ is then $\Delta F_d$.

Stability-wise, it makes no difference whether $F_L$ or $F_H$ is selected by the system. However, the multiplication factor $n$ of multiplier 15 is two units higher when $F_H$ is used. This may make it preferable to select $F_L$ in some cases. This can be perhaps seen better by mathematically reducing the value of frequency $F_d$ to the following expressions:

$$F_d=F_L-nF_r=(F_o-F_r)-nF_r=F_o-(n+1)F_r \quad (1)$$

Expressions 1 apply when filter 23 selects frequency $F_L$. On the other hand, if filter 23 selects frequency $F_H$ the following expressions apply:

$$F_d=F_H-(n+2)F_r=(F_o+F_r)-(n+2)F_r=F_o-(n+1)F_r \quad (2)$$

Thus, in either case it becomes obvious that variations $\Delta F_d$ in tuned frequency $F_d$ caused equal variations in the center frequency $F_o$. Such variations are minimized by making discriminator frequency $F_d$ as low as possible. The tuning error $\Delta F_d$ is a percentage of the tuned frequency $F_d$ of a conventional discriminator; such percentage may be of the order of 1% or 0.1%. It becomes very difficult to decrease the percentage to orders lower than 0.1%.

When frequency $F_L$ is selected by filter 23, the discriminator can be tuned to as low a frequency as is compatible with the opposite polarity sensing by the discriminator. When frequency $F_H$ is selected by filter 23, a sideband foldover problem can exist due to heterodyning $F_H$ down to a low value for frequency $F_d$. In many cases, this will require that $F_L$ be used in preference to $F_H$. However, use of $F_L$ is preferable for other reasons also, which are that its selection requires a lower tuned value for filter 23 and a lower frequency-multiplication factor for multiplier 15.

Since discriminator 17 is handling only a single input frequency, it need not have a linear output characteristic. By eliminating such linearity, frequency discriminators having a very large pull-in range can be used.

Furthermore, since a single frequency is received by the discriminator, great flexibility is permitted in the length of the time-constant of the discriminator's output low-pass filter 18, and it can be made very short to have a very fast acting stabilization system.

For voice, television, and most other types of information, no difficulty is encountered by having the carrier frequency $F_o$ momentarily go to zero at modulation-indices 2.4, 5.5, 8.7, 11.8, 14.9, etc., since with such transmission the modulation index is varying at a high rate; and such momentary occurrences have no effect on the system due to the operation of low-pass filter 18, which integrates out fast carrier variations. Where these zero modulation indices are encountered for moderate lengths of time, the time-constant of filter 18 is made correspondingly long to "remember" the carrier value over its zero periods.

Figure 3:
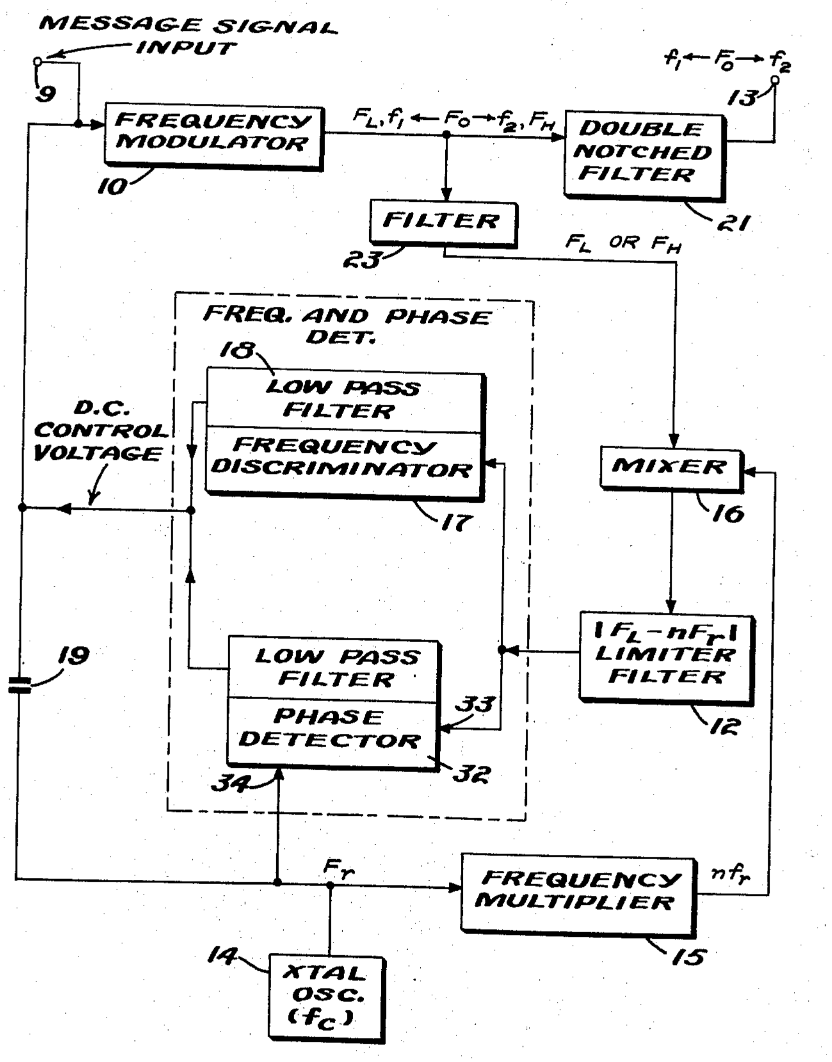
Figure 3 illustrates a modified form of the invention.

Figure 3 provides an addition to the system of Figure 1 which permits the elimination of discriminator error $\Delta F_d$, leaving only the reference-frequency error $\Delta F_r$ multiplied by factor $(n+1)$ in the system. Thus, a stabilization of one part in $10^7$ or $10^8$ is easily obtainable with presently available reference frequency sources.

In the phase stabilized system of Figure 3, center frequency $F_o$ is an integer multiple of reference frequency $F_r$. This is not required in the frequency stabilized system of Figure 1. Hence, in Figure 3, the output frequency $nF_r$ of multiplier 15 is equal to $(F_o-2F_r)$ to utilize $F_L$ for stabilization.

Like parts of Figures 1 and 3 are given the same reference numbers. Thus, items 9, 10, 21, 23, 14, 15, 16, 12, 17, 18 and 13 can be the same in both figures. In Figure 3, a phase detector 32 has its output and one input 33 connected in parallel with discriminator 17 to also receive mixer output frequency $(F_L-nF_r)$. Also, the crystal oscillator frequency $F_r$ is connected to the other input 34 of the phase detector. The phase and frequency detector can be a single entity as is described and claimed in patent application Serial No. 641,576 titled, "Frequency and Phase Detector" by Noel E. Hogue, assigned to the Collins Radio Company.

A further difference between the systems of Figures 3 and 1 is that in Figure 3 an additional restriction is placed on the tuned frequency of discriminator 17. It is tuned to the same frequency as is received at input 34 of the phase detector, which is $F_r$. However, input $F_r$ can be any multiple or submultiple of the reference frequency. Such a submultiple can be obtained by adding a frequency-divider between the output of reference oscillator 14 and phase detector input 34.

Although this invention has been described with respect to particular embodiments thereof, it is not to be so limited as changes and modifications may be made therein which are within the full intended scope of the invention as defined by the appended claims.

I claim:

1. A frequency-stabilized angular-modulation generator, comprising a reactance-shift modulator, input means for providing a message signal to said modulator, reference-frequency means also connected to the input of said modulator to generate upper and lower stabilizing frequencies, said stabilizing frequencies being outside the spectrum band generated by the message signal, a frequency mixer having a pair of inputs, means for multiplying the frequency of said reference-frequency means and having an output connected to one input of said mixer, a filter tuned to either the upper or the lower stabilizing frequency and receiving an input from the modulator, the output of said filter connected to the other input of said mixer, a stable frequency discriminator, means connecting said discriminator between the output of said mixer and the input of said modulator.

2. A frequency-stabilized frequency-modulation generator, comprising a wide-index frequency modulator, having a frequency-controlling input; means for connecting a message signal to said input, a crystal-controlled oscillator having its output also connected to said input to generate stabilizing frequencies in the output of said modulator outside the utilized spectrum generated by said message signal, a frequency mixer having a pair of inputs, frequency-multiplying means connecting said oscillator to one of said mixer inputs, a filter coupled between the other mixer input and the output of said modulator to select one of said stabilizing frequencies, a fixed-frequency discriminator, means connecting the first-order difference output of said mixer to said discriminator, a low-pass filter being provided at the output of said discriminator and being connected to the input of said modulator.

3. An automatic-frequency-control system for an angularly-modulated oscillator comprising, frequency-varying input means included with said oscillator to modulate it an to control its frequency, means for receiving a message signal connected to said input means, terminal means for receiving a reference frequency also being connected to said frequency-varying input means to also modulate opposite spectrum frequencies outside of the utilized spectrum generated by the message signal, a frequency mixer having a pair of inputs, a frequency multiplier connected between said terminal means and one mixer input, a filter connected between the output of said oscillator and the other input of said mixer to select one of said opposite spectrum frequencies, frequency-discriminator means tuned to a fixed frequency that is a fraction of the center frequency of said modulator, said discriminator being connected between the output of said mixer and said frequency-varying input means.

4. An automatic-frequency-control system as defined in claim 3 having a double-notched filter connected to the output of said modulated oscillator, with the notches of said filter corresponding to the opposite spectrum frequencies, with said notched filter passing the utilized spectrum generated by the message signal.

5. An automatic-frequency-control system as defined in claim 3 in which said discriminator is tuned to the reference frequency, a phase detector having a pair of inputs, and an output connected to said frequency-varying input means, with one phase-detector input being connected to the output of said mixer, and the other phase-detector input being connected to said reference-frequency terminal.

6. An automatic-frequency-control system as defined in claim 5 including a passband filter connected to the output of said modulator to provide the output of the system, the utilized spectrum generated by said modulating signal being within the band pass of said filter, and the opposite spectrum frequencies generated by the reference frequency being outside the band pass of said output filter.

7. An automatic-phase-control system for a large-index frequency modulator comprising, a modulating-signal input included with said modulator, first terminal means for receiving a message signal connected to said input to modulate a utilized message spectrum, second terminal means for receiving a reference frequency also being connected to said input to modulate opposite spectrum frequencies outside of the utilized message spectrum, a frequency mixer having a pair of inputs, a frequency multiplier connected between said second terminal means and one mixer input, a filter connected between the output of said modulator and the other input of said mixer to select the lowest of said opposite spectrum frequencies, phase-detecting means having a pair of inputs, with means connecting one input to said second terminal means, and other means connecting the other phase-detecting means input to the output of said frequency mixer, low-pass filtering means connected between the output of said phase detecting means and said input of said modulator.

8. A system as defined in claim 7 including a bandpass filter connected to the output of said modulator to pass the utilized message spectrum, said opposite spectrum points being outside the bandpass of said filter and being attenuated by it.

9. A phase-and-frequency stabilized wide-index frequency modulator comprising, modulating-signal input means of said modulator, means for providing a message signal to said input means to modulate a utilized message spectrum, means providing a reference frequency to said input means to generate opposite-spectrum frequencies outside of said utilized spectrum, a filter connected to the output of said modulator for passing the lowest of said opposite-spectrum frequencies, a frequency mixer having a pair of inputs, with one input connected to the output of said filter, frequency-translation means connecting said reference frequency to said other mixer input, limiting and filtering means connected to the output of said mixer for passing its first-order difference output signal, a frequency discriminator having its input connected to the output of said limiting and filtering means, said discriminator tuned to a multiple or submultiple of said reference frequency, a phase-detector having a pair of inputs, with one input being connected to the output of said limiting and filtering means, the other phase-detector input being connected to said multiple or submultiple frequency, low-pass filtering means receiving the outputs of said frequency discriminator and phase detector, and the output of said low-pass filtering means connected to said input means of said modulator.

10. A system as defined in claim 9 having a bandpass filter connected to the output of said modulator, said filter bandpass including the utilized message spectrum, said opposite spectrum frequencies being outside of said bandpass and being attenuated by said filter.

References Cited in the file of this patent

UNITED STATES PATENTS

| | | |
|---|---|---|
| 2,562,943 | Pennsyl | Aug. 7, 1951 |
| 2,692,947 | Spencer | Oct. 26, 1954 |